(12) United States Patent
Lin

(10) Patent No.: US 12,158,998 B2
(45) Date of Patent: Dec. 3, 2024

(54) ACTIVE STYLUS

(71) Applicant: ELAN MICROELECTRONICS CORPORATION, Hsin-Chu (TW)

(72) Inventor: Chia-Hsing Lin, Hsinchu (TW)

(73) Assignee: ELAN MICROELECTRONICS CORPORATION, Hsin-Chu (TW)

( * ) Notice: Subject to any disclaimer, the term of this patent is extended or adjusted under 35 U.S.C. 154(b) by 11 days.

(21) Appl. No.: 18/358,612

(22) Filed: Jul. 25, 2023

(65) Prior Publication Data
US 2024/0045517 A1 Feb. 8, 2024

Related U.S. Application Data

(60) Provisional application No. 63/394,296, filed on Aug. 2, 2022.

(30) Foreign Application Priority Data

Apr. 24, 2023 (TW) ................................. 112115107

(51) Int. Cl.
*G06F 3/0354* (2013.01)
*G06F 3/038* (2013.01)

(52) U.S. Cl.
CPC .......... *G06F 3/03545* (2013.01); *G06F 3/038* (2013.01)

(58) Field of Classification Search
CPC ................. G06F 3/03545; G06F 3/038; G06F 3/041662; G06F 3/044
See application file for complete search history.

(56) References Cited

U.S. PATENT DOCUMENTS

| | | | |
|---|---|---|---|
| 10,474,258 B2 * | 11/2019 | Sahar ..................... | G06F 3/0383 |
| 11,416,088 B1 * | 8/2022 | Xie ........................ | G06F 3/0383 |
| 2007/0146351 A1 * | 6/2007 | Katsurahira ........ | G06F 3/04166 |
| | | | 345/179 |
| 2010/0206644 A1 * | 8/2010 | Yeh ...................... | G06F 3/03545 |
| | | | 178/18.07 |
| 2014/0240298 A1 * | 8/2014 | Stern ..................... | G06F 3/0383 |
| | | | 345/179 |
| 2016/0077843 A1 * | 3/2016 | Jakoboski ............ | H01R 31/065 |
| | | | 710/8 |
| 2017/0248999 A1 * | 8/2017 | Ng ......................... | H01R 31/06 |
| 2017/0277284 A1 * | 9/2017 | Kim ..................... | G06F 3/03545 |
| 2018/0267636 A1 * | 9/2018 | Chiu .................... | G06F 3/03545 |
| 2018/0284910 A1 * | 10/2018 | Peretz .................... | G06F 3/041 |
| 2019/0179435 A1 * | 6/2019 | Yuan ..................... | H02M 7/537 |

FOREIGN PATENT DOCUMENTS

CN 113302580 A 8/2021

OTHER PUBLICATIONS

Examination Report with Search Report dated Sep. 20, 2023 issued in corresponding Taiwan Application No. 112115107.

* cited by examiner

*Primary Examiner* — Dmitriy Bolotin
(74) *Attorney, Agent, or Firm* — MUNCY, GEISSLER, OLDS & LOWE, P.C.

(57) ABSTRACT

An active stylus includes an electrode, a recycling capacitor, a first switch, a power source, and a second switch. The first switch is coupled between the recycling capacitor and the electrode. The second switch is coupled between the power source and the electrode. In a first phase, the second switch is turned on, the power source provides a current or a voltage for the electrode and the first switch is turned off. In a second phase, the second switch is turned off and the first switch is turned on. Alternatively, the recycling capacitor may be replaced with an electrode.

18 Claims, 23 Drawing Sheets

ACTIVE STYLUS

This application claims priority for the U.S. provisional patent application No. 63/394,296 filed on 2 Aug. 2022, and the TW patent application no. 112115107 filed on 24 Apr. 2022, the content of which is incorporated by reference in its entirely.

BACKGROUND OF THE INVENTION

Field of the Invention

The invention relates to a stylus, particularly to an active stylus.

Description of the Related Art

The active stylus can be used for input on a capacitive touch panel. The operation of the active stylus involves emitting signals to the capacitive touch panel, which consumes power. Therefore, the active stylus has a demand for power saving so that it can be used for a longer period of time.

SUMMARY OF THE INVENTION

The invention provides an active stylus, which has the advantage of saving power.

In an embodiment of the invention, an active stylus includes an electrode, a recycling capacitor, a first switch, a power source, and a second switch. The first switch is coupled between the recycling capacitor and the electrode. The second switch is coupled between the power source and the electrode. In a first phase, the second switch is turned on, the power source provides a current or a voltage for the electrode and the first switch is turned off. In a second phase, the second switch is turned off and the first switch is turned on. Alternatively, the recycling capacitor may be replaced with an electrode.

In an embodiment of the invention, an active stylus includes a first electrode, a second electrode, a first switch, a power source, and a second switch. The second electrode forms a coupling capacitor with a conductor adjacent to the second electrode. The first switch is coupled between the first electrode and the second electrode. The second switch is coupled between the power source and the first electrode. In a first phase, the second switch is turned on, the power source provides a first voltage or a first current for the first electrode, and the first switch is turned off. In a second phase, the second switch is turned off and the first switch is turned on, thereby recycling charges on the first electrode to the coupling capacitor.

Below, the embodiments are described in detail in cooperation with the drawings to make easily understood the technical contents, characteristics and accomplishments of the invention.

DETAILED DESCRIPTION OF THE INVENTION

Figure 1:
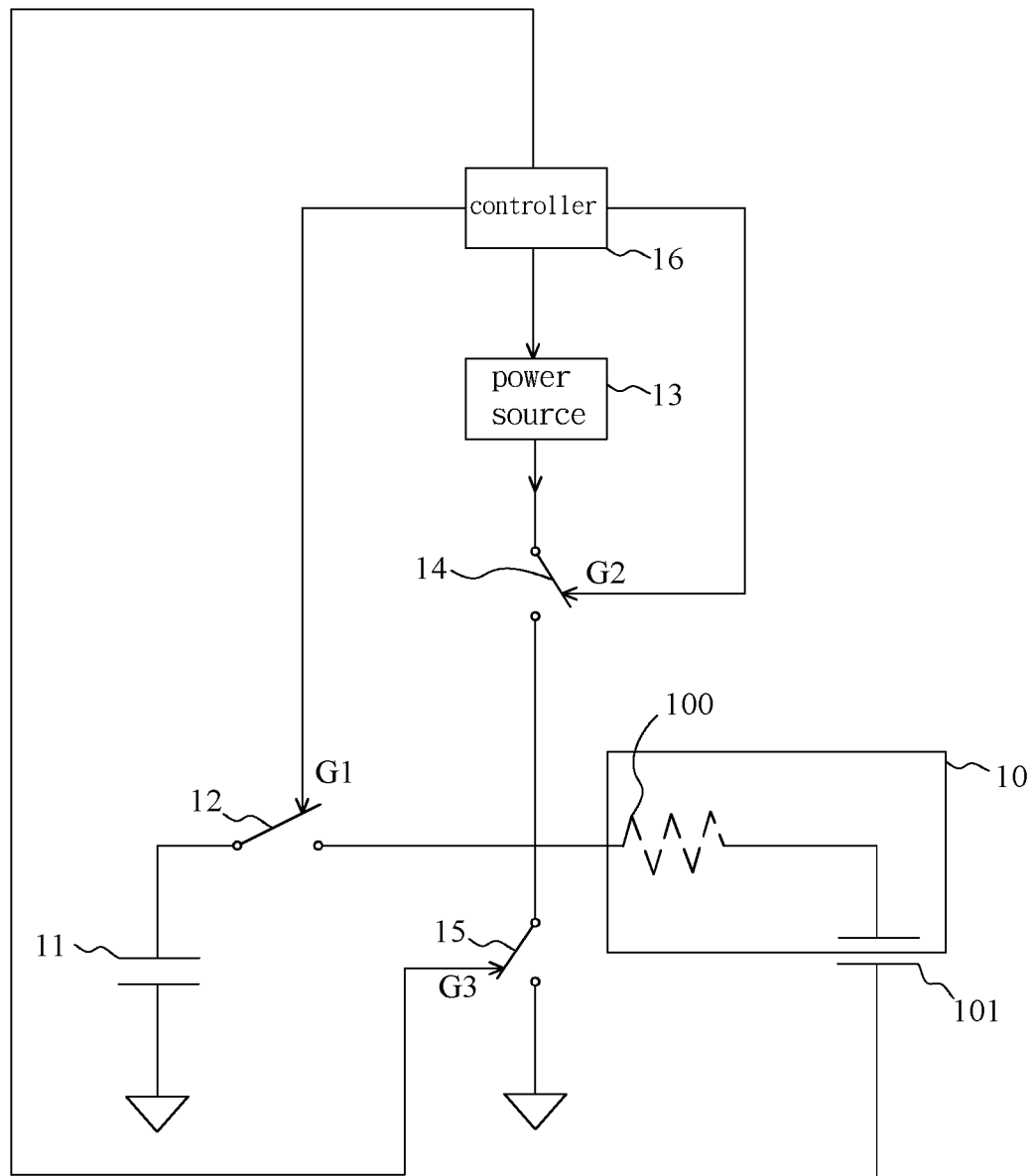
FIG. 1 is a diagram schematically showing the equivalent circuit of an active stylus according to a first embodiment of the invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, specific components, structures and features in one or more embodiments may be combined in an appropriate manner.

Certain terms are used throughout the description and the claims to refer to particular components. One skilled in the art appreciates that a component may be referred using as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to encompass any indirect or direct connection. Accordingly, if this disclosure mentions that a first device is coupled with a second device, it means that the first device may be directly or indirectly connected to the second device through electrical connections, wireless communications, optical communications, or other signal connections with/ without other intermediate devices or connection means.

FIG. 1 is a diagram schematically showing the equivalent circuit of an active stylus according to a first embodiment of the invention. Please refer to FIG. 1. The first embodiment of the invention is introduced as follows. The active stylus 1 includes an electrode 10, a recycling capacitor 11, a first switch 12, a power source 13, and a second switch 14. The first switch 12 is coupled between the recycling capacitor 11 and the electrode 10. The recycling capacitor 11 is coupled to a grounding terminal. The second switch 14 is coupled between the power source 13 and the electrode 10. The electrode 10 has a resistance 100. When the electrode 10 approaches a conductor such as a capacitive touch panel, the electrode 10 and the conductor form a coupling capacitor 101. In some embodiments, the active stylus 1 may further include a third switch 15 and a controller 16. The third switch 15 is coupled between the electrode 10 and the grounding terminal. The controller 16 is coupled to the power source 13, the first switch 12, the second switch 14, and the third switch 15 and configured to turn on or turn off the first switch 12, the second switch 14, and the third switch 15. The power source 13 may be, for example, a voltage source or a current source. The combination of the controller 16, the power source 13, and the switch 14 can be regarded as an excitation signal generator that provides an excitation signal for the electrode 10. The excitation signal can be a periodic voltage signal or a periodic current signal. The controller 16 may control the power source 13 to turn on or turn off. The controller 16 and the power source 13 may be integrated in an integrated circuit (IC) device or arranged separately and independently. In an embodiment, the controller 16 and the recycling capacitor 11 are integrated in an integrated circuit (IC) device.

Figure 2A:
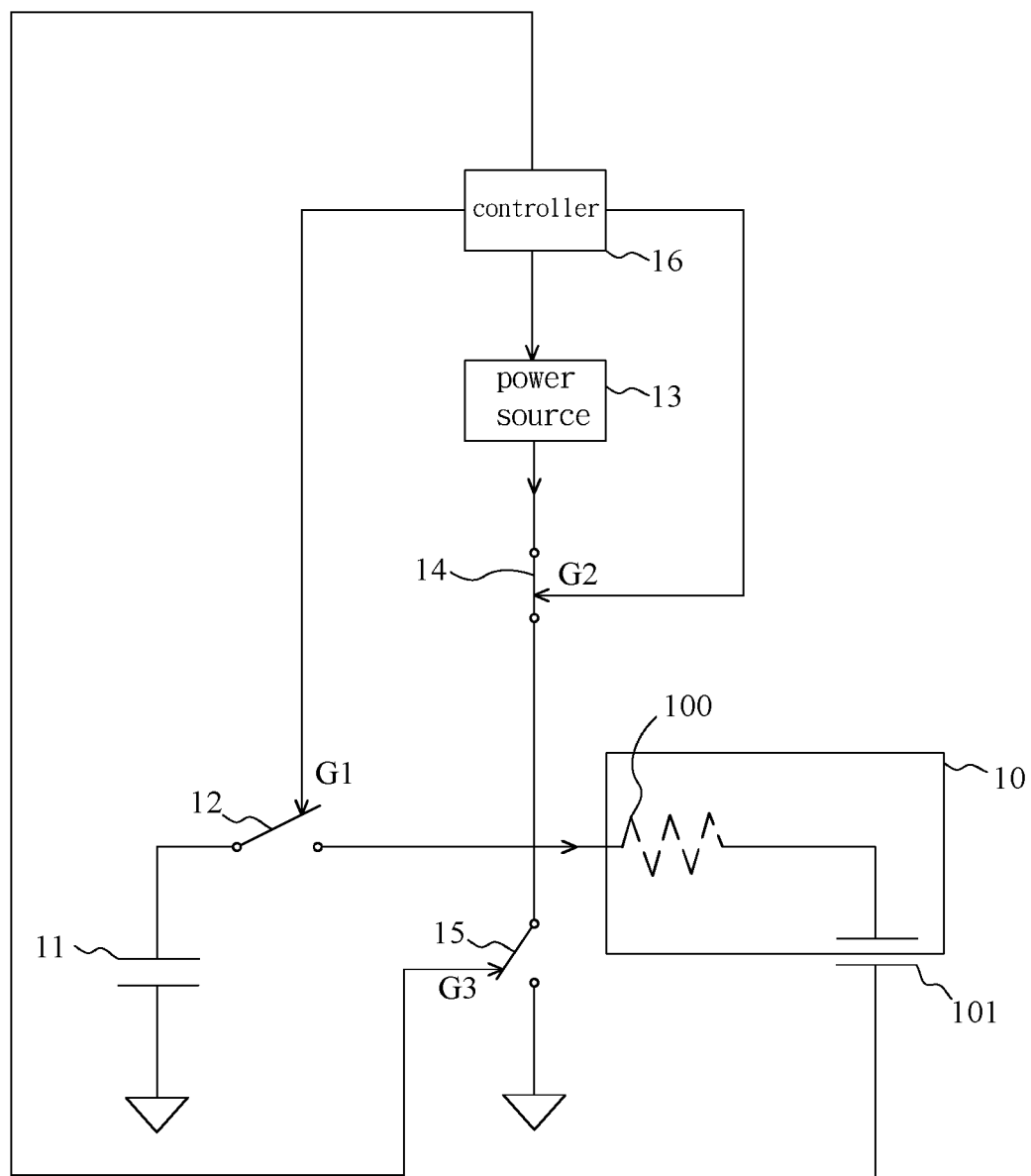
FIGS. 2(a)-2(d) show the operation of the active stylus in FIG. 1.
Figure 2B:
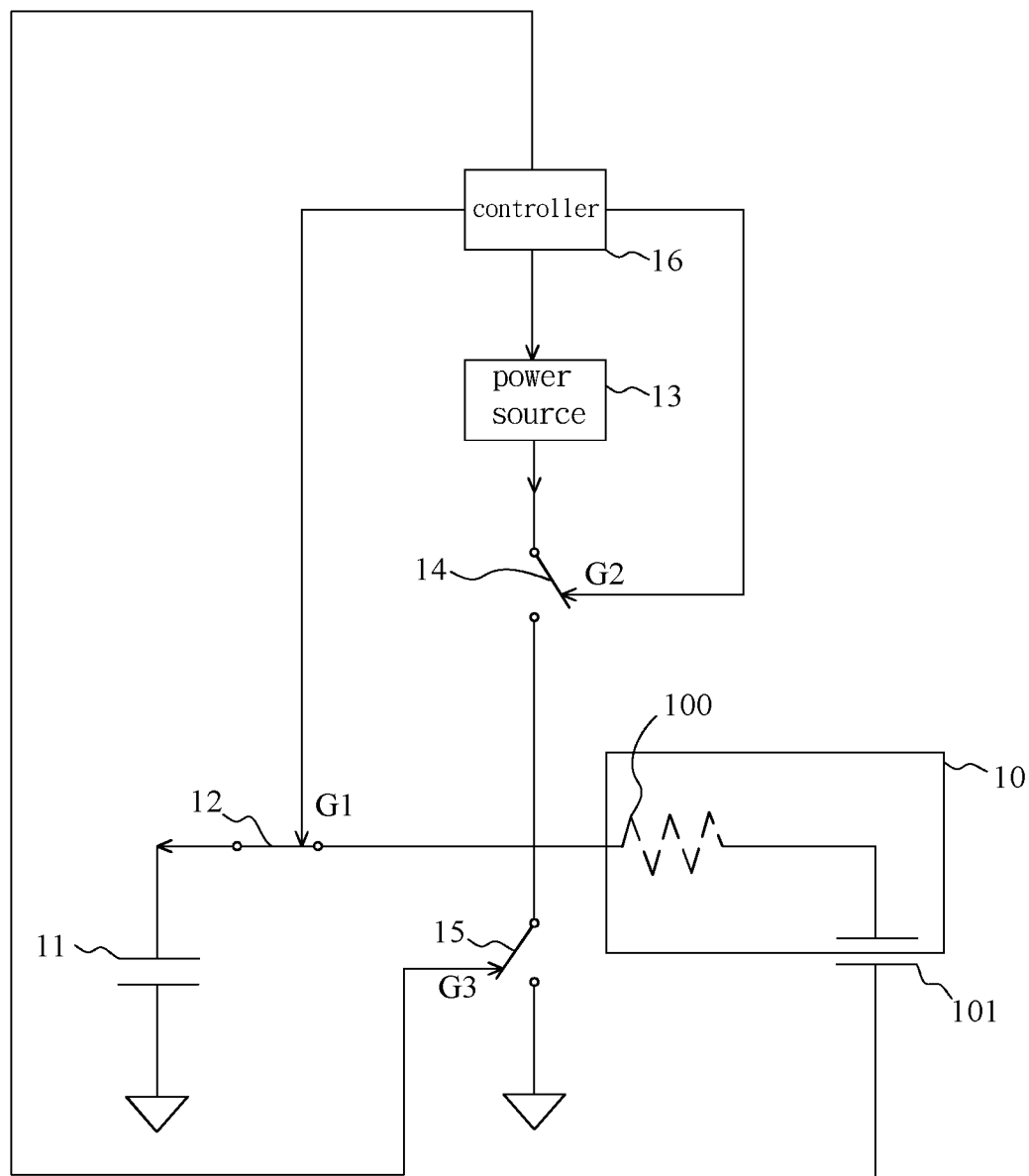
Figure 2C:
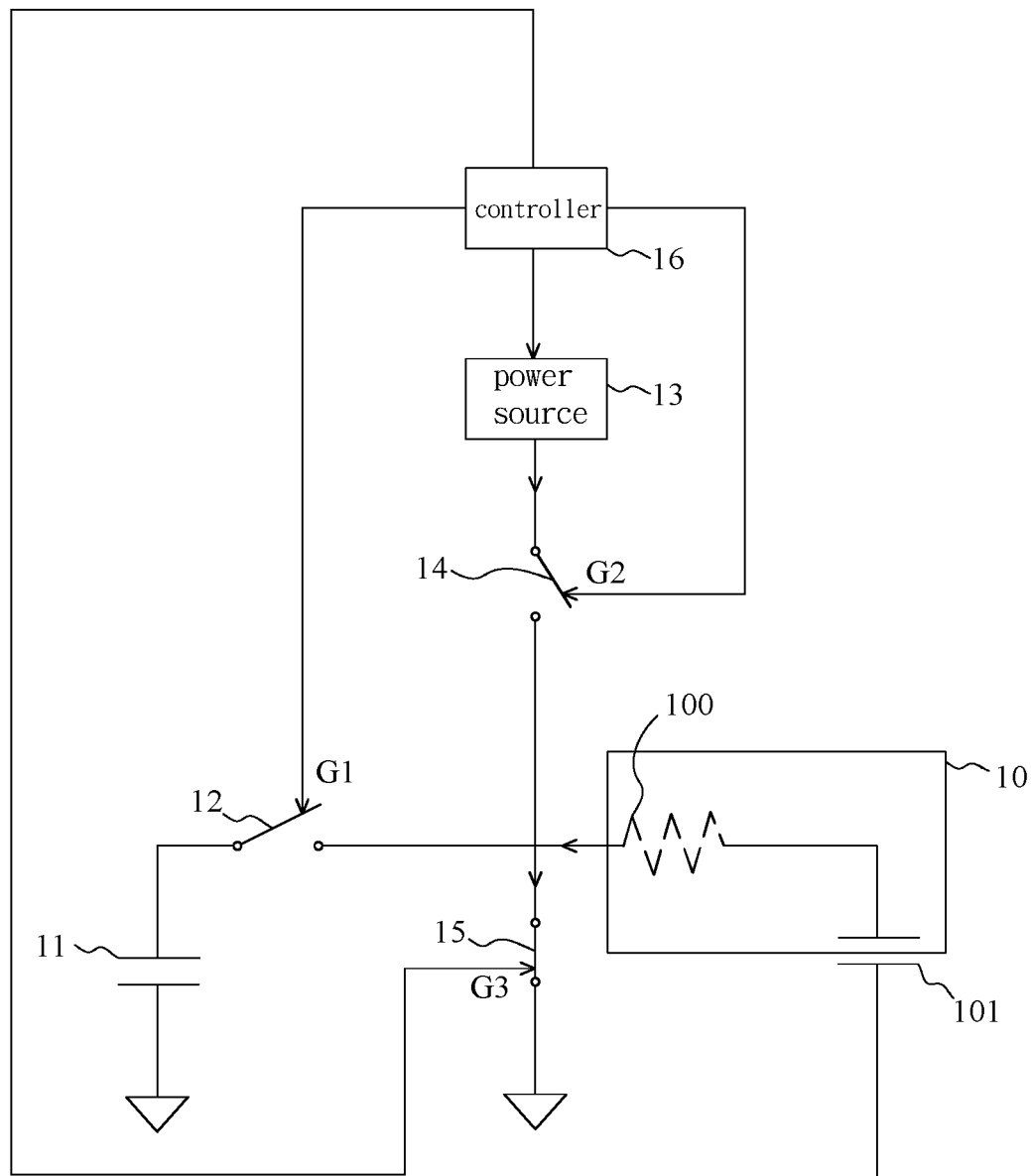
Figure 2D:
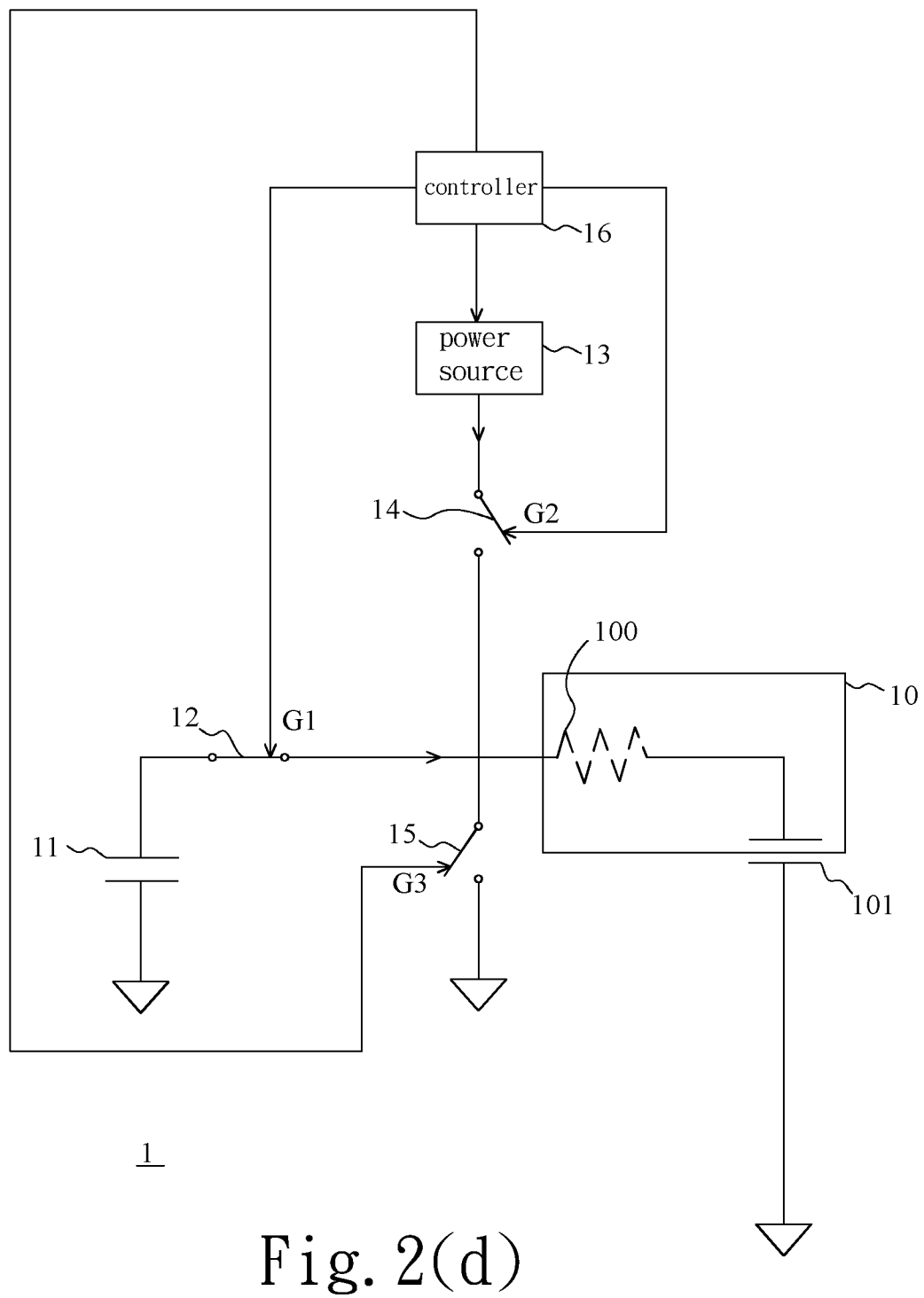

FIGS. 2(a)-2(d) respectively show the operation of the active stylus 1 of FIG. 1 in a first phase, a second phase, a third phase, and a fourth phase. The first switch 12 is controlled by a control signal G1, the second switch 14 is controlled by a control signal G2, and the third switch 15 is controlled by a control signal G3. The control signals G1~G3 are provided by the controller 16. As shown in FIG. 2(a), in the first phase, the controller 16 turns on the second switch 14 and turns off the first switch 12 and the third switch 15, such that the power source 13 provides a voltage or a current for the electrode 10. As shown in FIG. 2(b), in the second phase after the first phase, the controller 16 turns off the second switch 14 and the third switch 15 and turns on the first switch 12. Since the voltage of the electrode 10 is greater than a voltage across the recycling capacitor 11, the electrode 10 charges the recycling capacitor 11 through the first switch 12. This process can be understood as that the charges provided to the electrode 10 are recycled into the recycling capacitor 11. As shown in FIG. 2(c), in the third phase after the second phase, the controller 16 turns off the first switch 12 and the second switch 14 and turns on the third switch 15. At this time, the electrode 10 is grounded. As shown in FIG. 2(d), in the fourth phase after the third phase, the controller 16 turns off the second switch 14 and the third switch 15 and turns on the first switch 12. At this time, the recycling capacitor 11 charges the electrode 10, such that the voltage of the electrode 10 rises. From the foregoing process, it can be understood that the charges are firstly recycled to the recycling capacitor 11 in the second phase. Then, the recycling capacitor 11 recharges the electrode 10 in the fourth phase, so that the voltage of the electrode 10 rises to a first level. When the operation of the active stylus 1 returns to the first phase, the power source 13 only needs less power to pull up the voltage of the electrode 10 from the first level to a required second level. Therefore, the operation of the active stylus 1 can save power.

The capacitance of the recycling capacitor 11 can be designed to be much larger than the capacitance of the coupling capacitor 101. For example, the capacitance of the recycling capacitor 11 is at least 1 nF and the capacitance of the coupling capacitor 101 is not greater than 50 pF. In practice, the average current consumed by the first embodiment of the active stylus 1 is 17.5 μA and the average current consumed by the conventional technology is 27.5 μA. Compared with the conventional technology, the power consumption of the active stylus 1 is greatly reduced by 36%.

Figure 3:
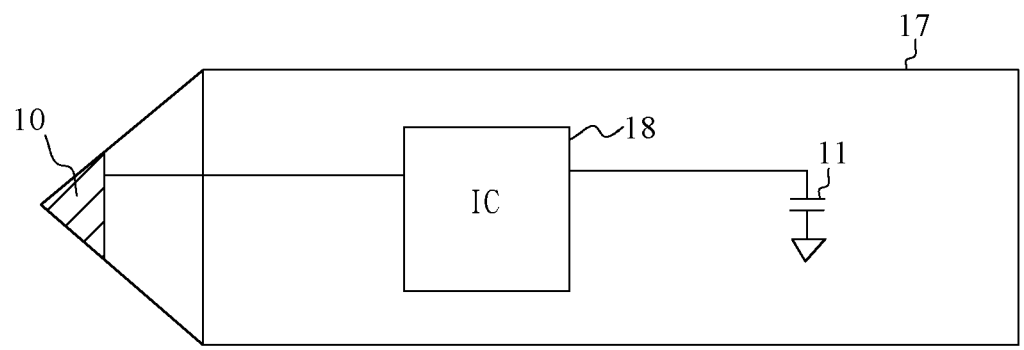
FIG. 3 is a diagram schematically showing the locations of an electrode and a recycling capacitor on an active stylus body according to a first embodiment of the invention.

The embodiment in FIG. 1 can be implemented as the architecture shown in FIG. 3. In the embodiment shown in FIG. 3, the active stylus 1 includes a stylus body 17 and an integrated circuit (IC) device 18, the recycling capacitor 11 and the integrated circuit device 18 are arranged in the stylus body 17. The integrated circuit device 18 may include a power source 13 and a controller 16. In FIG. 3, the electrode 10 is arranged at the tip of the stylus body 17 of the active stylus 1 and used as a tip electrode. The tip electrodes are configured to emit signals for input on the surface of the capacitive touch panel.

Figure 4:
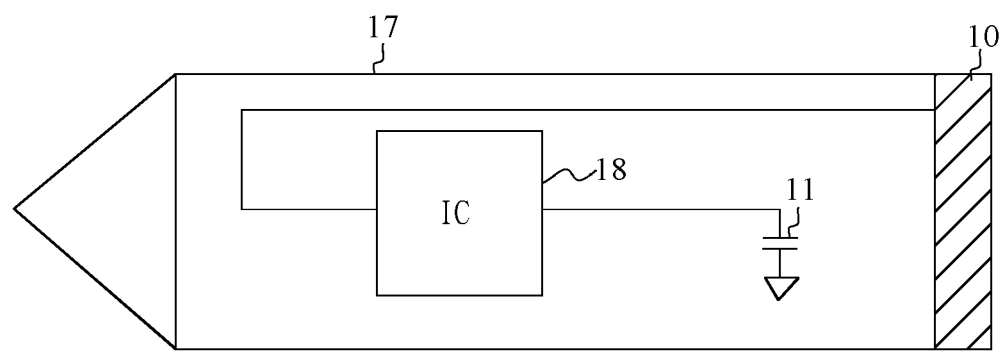
FIG. 4 is a diagram schematically showing the locations of an electrode and a recycling capacitor on an active stylus body according to a second embodiment of the invention.

The electrode 10 can also be arranged at other positions of the stylus body 17. In the embodiment shown in FIG. 4, the electrode 10 is arranged at the tail of the stylus body 17 of the active stylus 1 and used as a tail electrode. The tail electrode can be configured to communicate with the outside device, or to perform specific functions.

Figure 5:
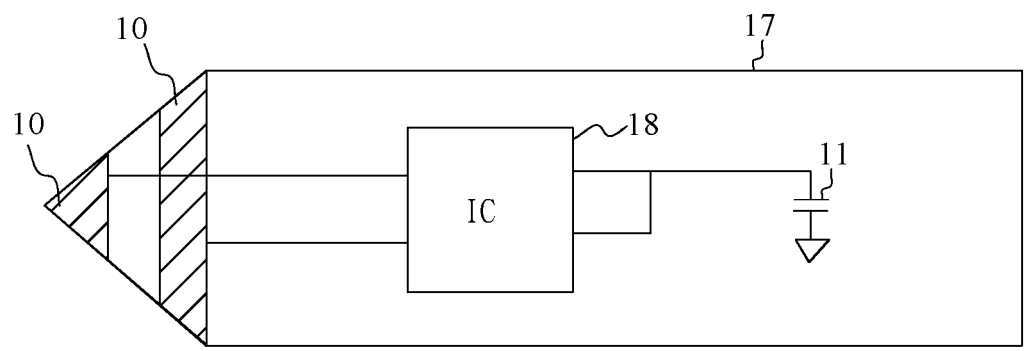
FIG. 5 is a diagram schematically showing the locations of an electrode and a recycling capacitor on an active stylus body according to a third embodiment of the invention.

The number of electrodes 10 can be more than one. The embodiment shown in FIG. 5 includes two electrodes 10 and one recycling capacitor 11. The difference between FIG. 3 and FIG. 5 is that the embodiment in FIG. 5 employs two electrodes 10 to share one recycling capacitor 11.

Figure 6:
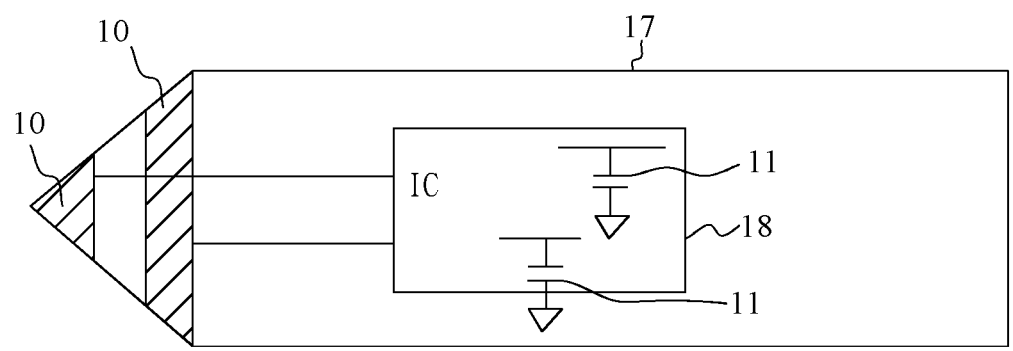
FIG. 6 is a diagram schematically showing the locations of an electrode and a recycling capacitor on an active stylus body according to a fourth embodiment of the invention.

The number of the recycling capacitors 11 can be more than one. The recycling capacitor 11 may also be integrated in the integrated circuit device 18. Please refer to FIG. 6. The difference between the embodiments in FIG. 3 and FIG. 6 is that the embodiment in FIG. 6 includes two recycling capacitors 11 integrated in the integrated circuit device 18.

Figure 7:
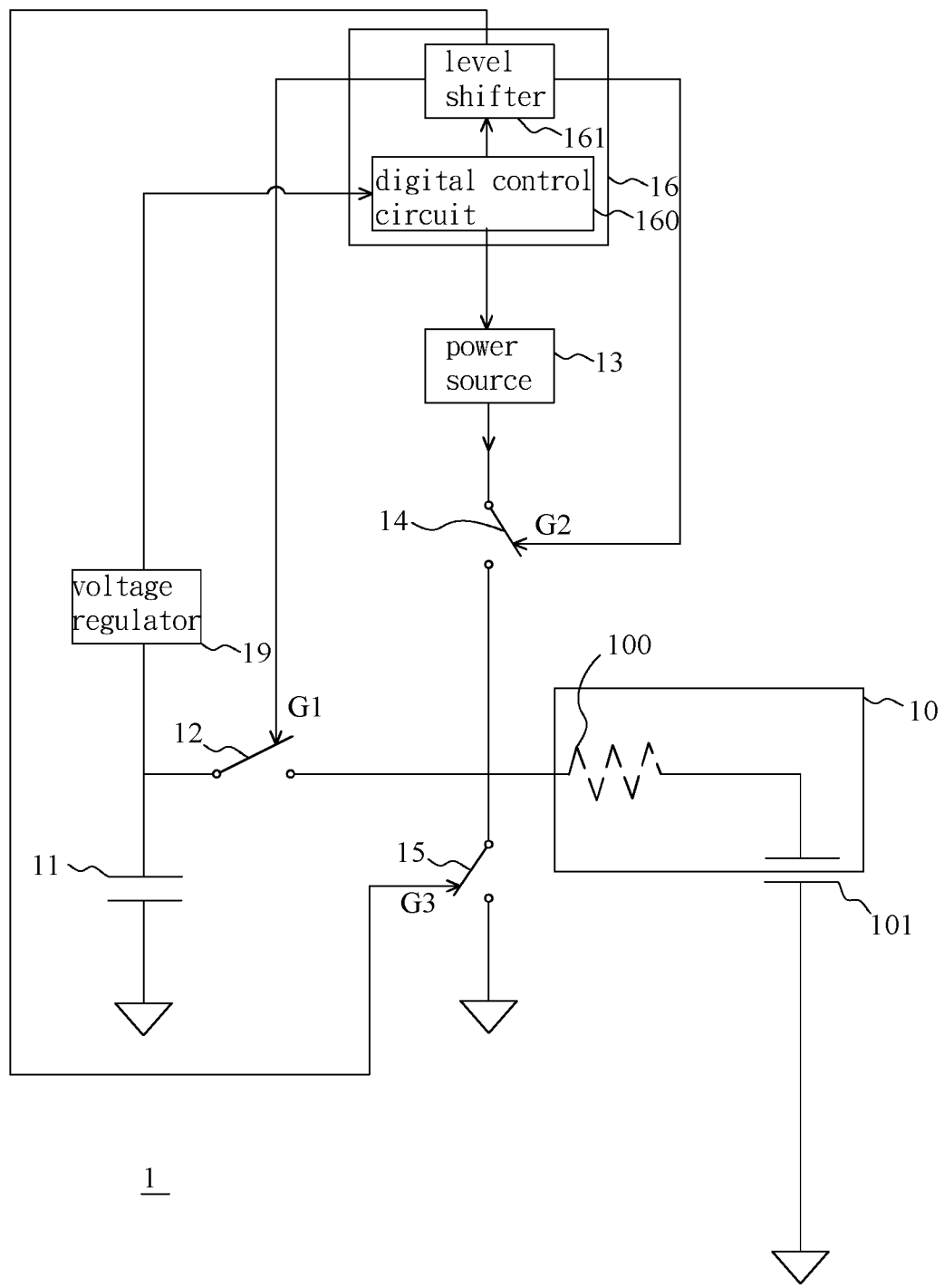
FIG. 7 is a diagram schematically showing the equivalent circuit of an active stylus according to a second embodiment of the invention.

FIG. 7 is a diagram schematically showing the equivalent circuit of an active stylus according to a second embodiment of the invention. Please refer to FIG. 7. Compared with FIG. 1, the active stylus 1 in FIG. 7 further includes a voltage regulator 19 coupled to the recycling capacitor 11 and the controller 16. The voltage regulator 19 may be, but not limited to, a low voltage regulator. In different embodiments, the voltage regulator 19, the controller 16 and the power source 13 can be integrated in an integrated circuit device or arranged separately and independently.

Figure 8A:
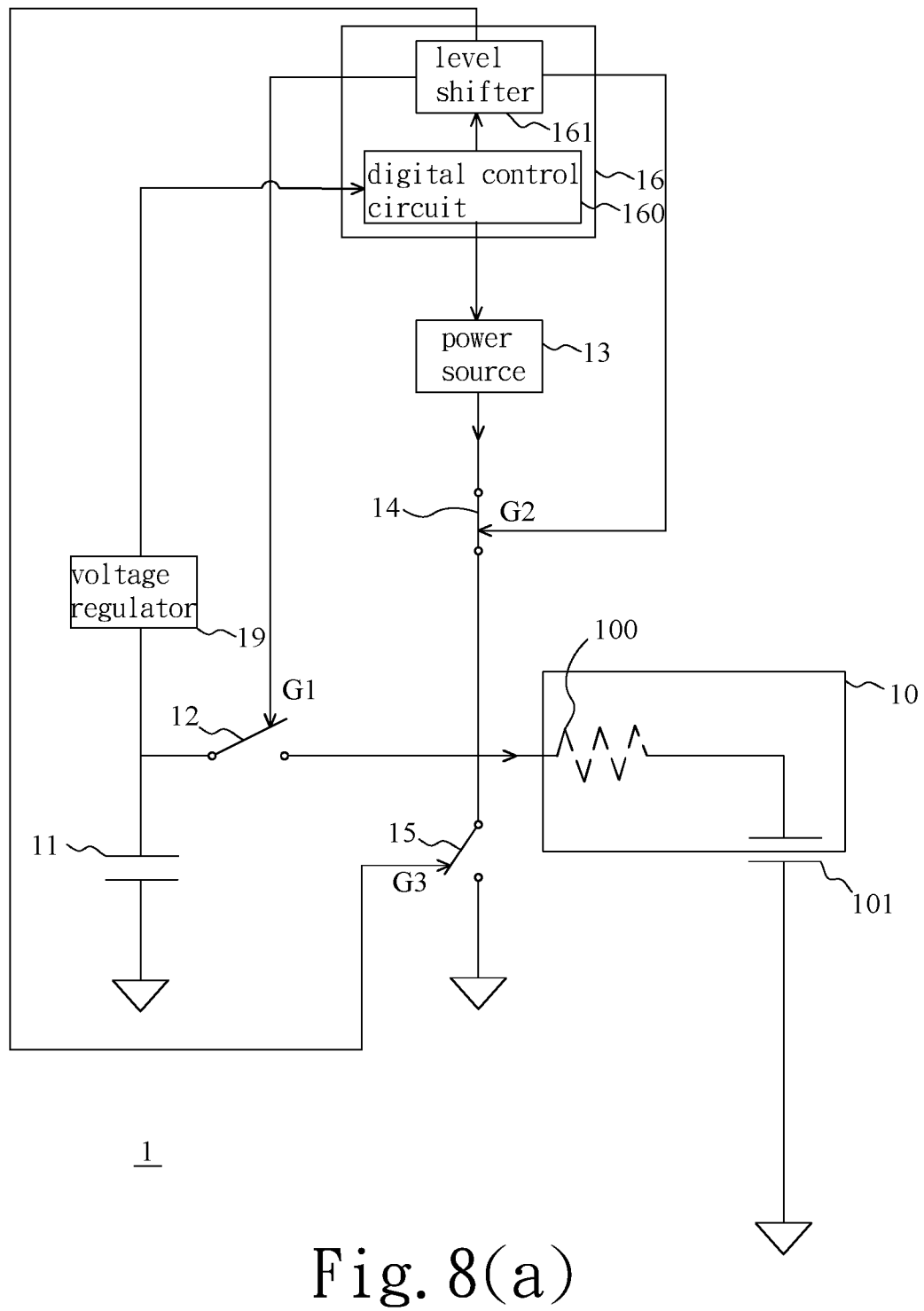
FIGS. 8(a)-8(c) show the operation of the active stylus in FIG. 7.
Figure 8B:
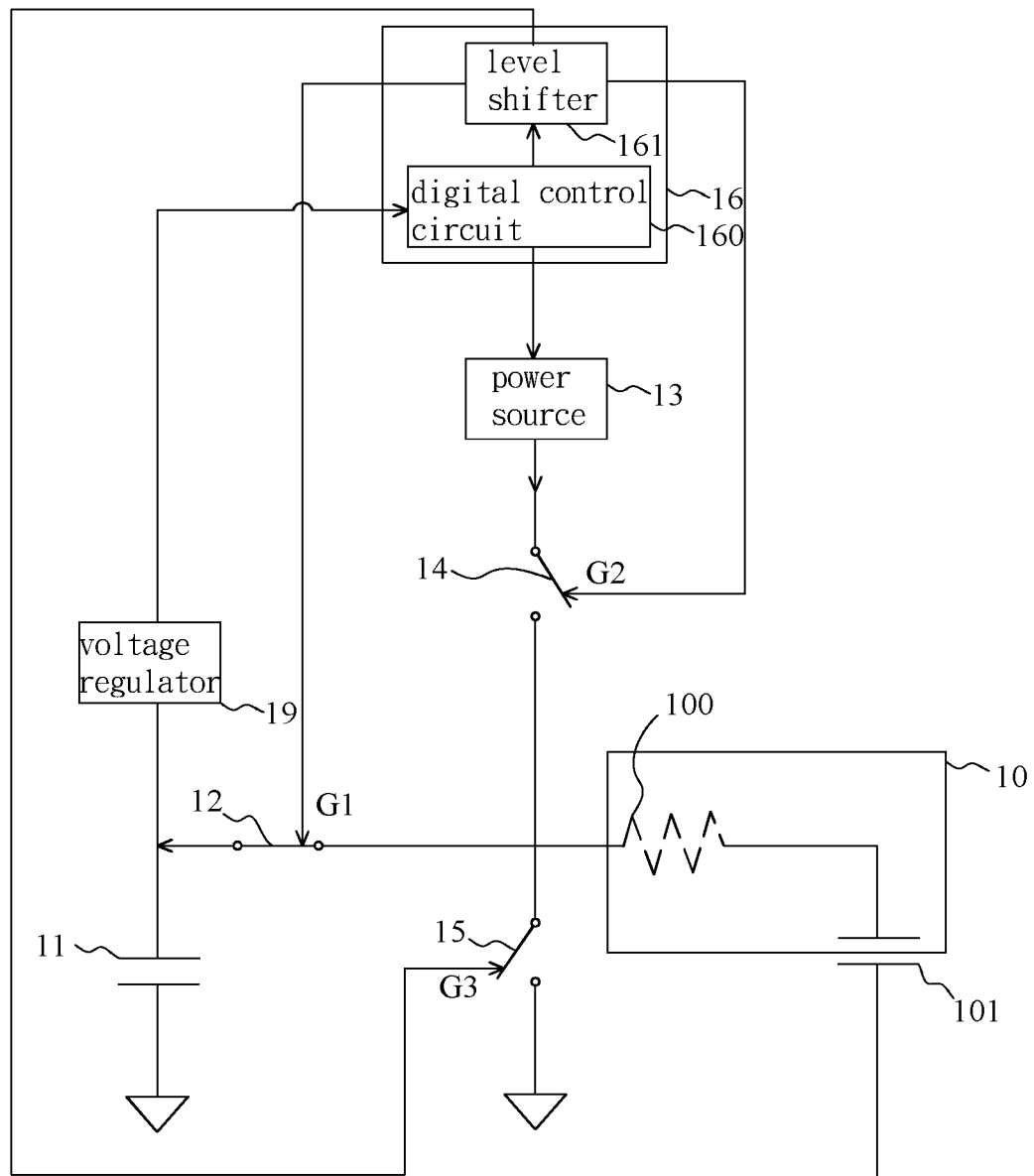
Figure 8C:
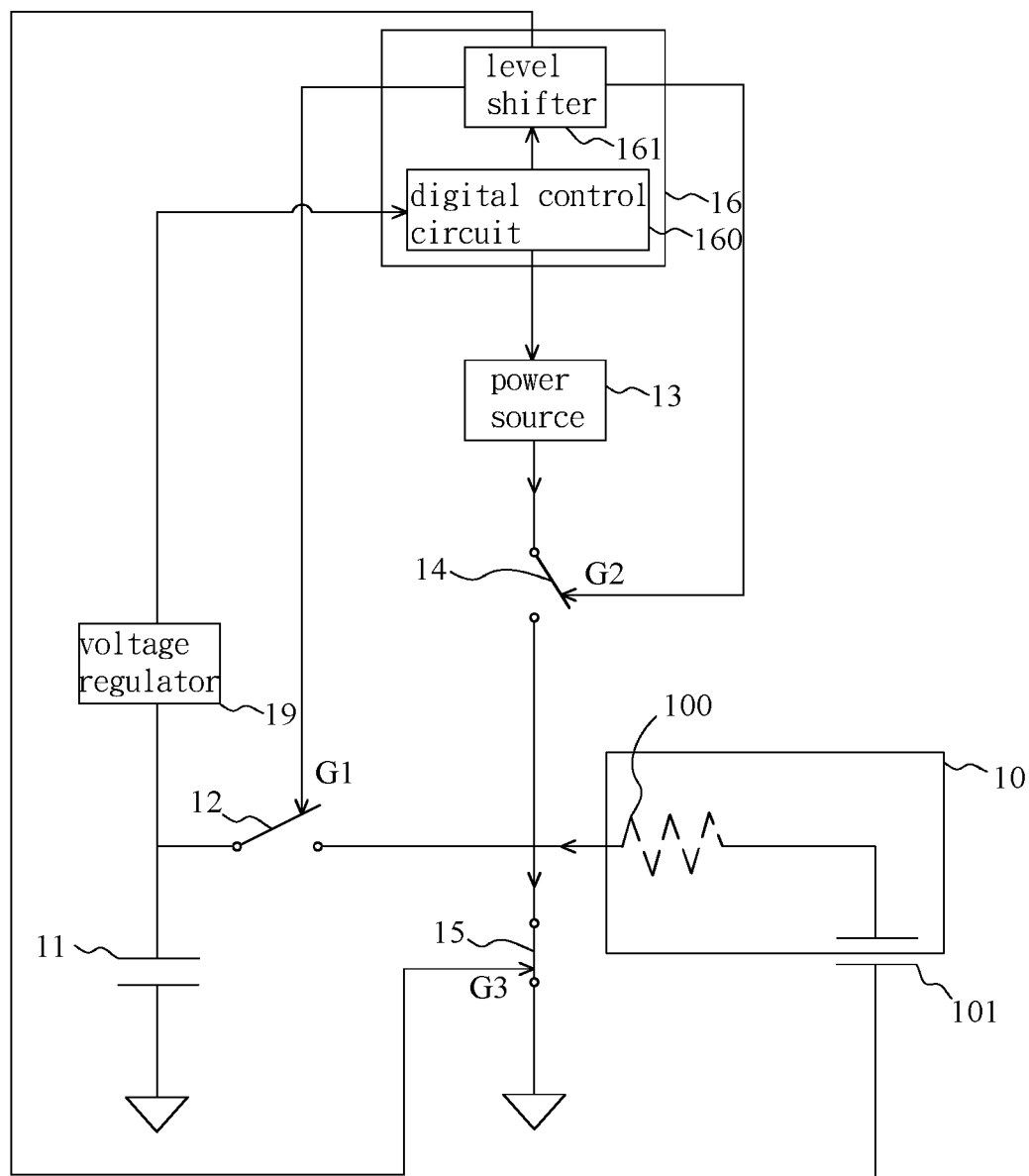

FIGS. 8(a)-8(c) respectively show the operation of the active stylus 1 of FIG. 7 in a first phase, a second phase, and a third phase. The first switch 12 is controlled by a control signal G1, the second switch 14 is controlled by a control signal G2, and the third switch 15 is controlled by a control signal G3. The control signals G1~G3 are provided by the controller 16. As shown in FIG. 8(*a*), in the first phase, the controller 16 turns on the second switch 14 and turns off the first switch 12 and the third switch 15, such that the power source 13 provides a voltage or a current for the electrode 10. As shown in FIG. 8(*b*), in the second phase after the first phase, the controller 16 turns off the second switch 14 and the third switch 15 and turns on the first switch 12, such that the electrode 10 charges the recycling capacitor 11 through the first switch 12. This process can be understood as that the charges provided to the electrode 10 are recycled into the recycling capacitor 11. As shown in FIG. 8(*c*), in the third phase after the second phase, the controller 16 turns off the first switch 12 and the second switch 14 and turns on the third switch 15. At this time, the electrode 10 is grounded.

In some embodiments, the controller 16 may include, but is not limited to, a digital control circuit 160 and a level shifter 161. The digital control circuit 160 can be coupled between the level shifter 161 and the power source 13. The level shifter 161 can be coupled to the first switch 12, the second switch 14, and the third switch 15. The digital control circuit 160 controls the level shifter 161 to generate the control signals G1, G2 and G3 for turning on or turning off the first switch 12, the second switch 14, and the third switch 15. In one embodiment, the voltage regulator 19 is a low voltage regulator. The voltage regulator 19 and the recycling capacitor 11 are configured to provide voltages for the digital control circuit 160. The voltage across the recycling capacitor 11 is limited to a low voltage under a threshold value, and has very small variation. Thus, it is not necessary to perform the step of charging the coupling capacitor 101 with the recycling capacitor 11 in FIG. 2(*d*). The charges recycled by the recycling capacitor 11 from the electrode 10 in the second phase can be provided to the voltage regulator 19 and the digital circuit. Accordingly, the power consumption of the active stylus 1 can still be reduced and its operation can save power.

The capacitance of the recycling capacitor 11 can be designed to be much larger than the capacitance of the coupling capacitor 101. For example, the recycling capacitor 11 has a capacitance of 1 μF and the coupling capacitor 101 has a capacitance of 50 pF. Assume that the power source 13 generates a high voltage of 20 volts, the voltage across the recycling capacitor 11 coupled to the voltage regulator 19 is 1.2 volts, and that the charging frequency of the coupling capacitor 101 is 250 kHz. Therefore, the average recycling current is $(20-1.2) \times 50 \times 10^{-12} \times 250 \times 10^3 = 235$ μA.

Figure 9:
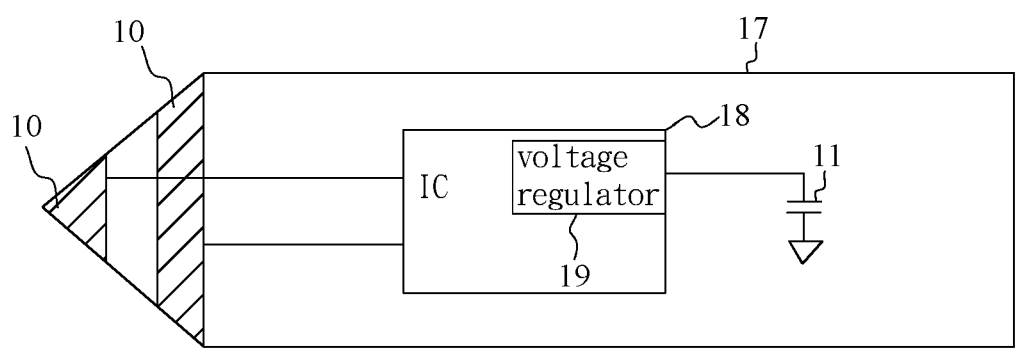
FIG. 9 is a diagram schematically showing the locations of an electrode and a recycling capacitor on an active stylus body according to a fifth embodiment of the invention.

The embodiment in FIG. 7 can be implemented as the architecture shown in FIG. 9. In the embodiment shown in FIG. 9, the active stylus 1 includes a stylus body 17 and an integrated (IC) circuit device 18. The recycling capacitor 11 and the integrated circuit device 18 are arranged in the stylus body 17. The integrated circuit 18 may include a power source 13, a controller 16, and a voltage regulator 19. The recycling capacitor 11 is arranged outside the integrated circuit 18 and electrically connected to the voltage regulator 19 in the integrated circuit device 18. In FIG. 9, the electrode 10 is arranged at the tip of the stylus body 17 of the active stylus 1 and used as a tip electrode and/or a ring electrode.

Figure 10:
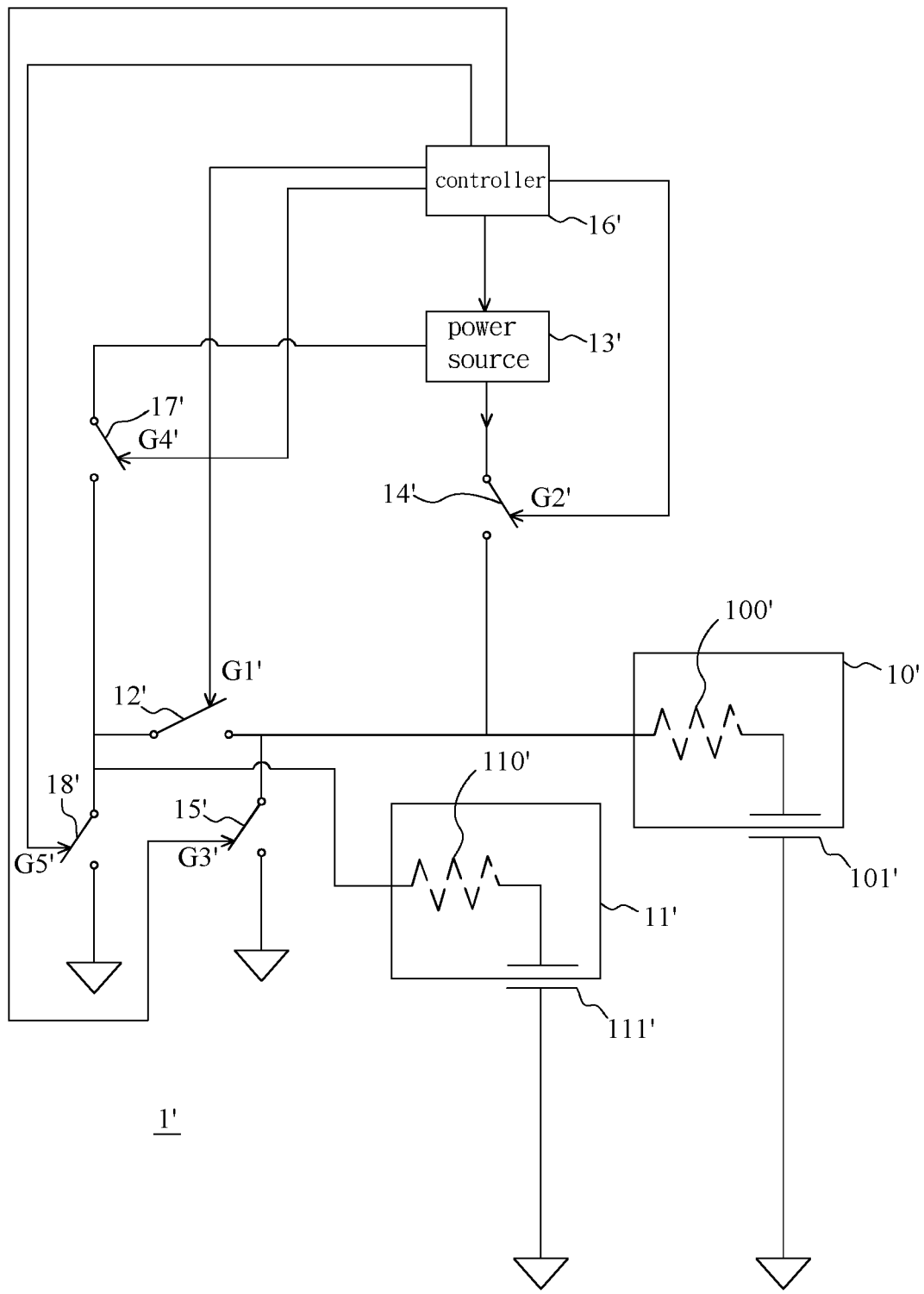
FIG. 10 is a diagram schematically showing the equivalent circuit of an active stylus according to a third embodiment of the invention.
Figure 11A:
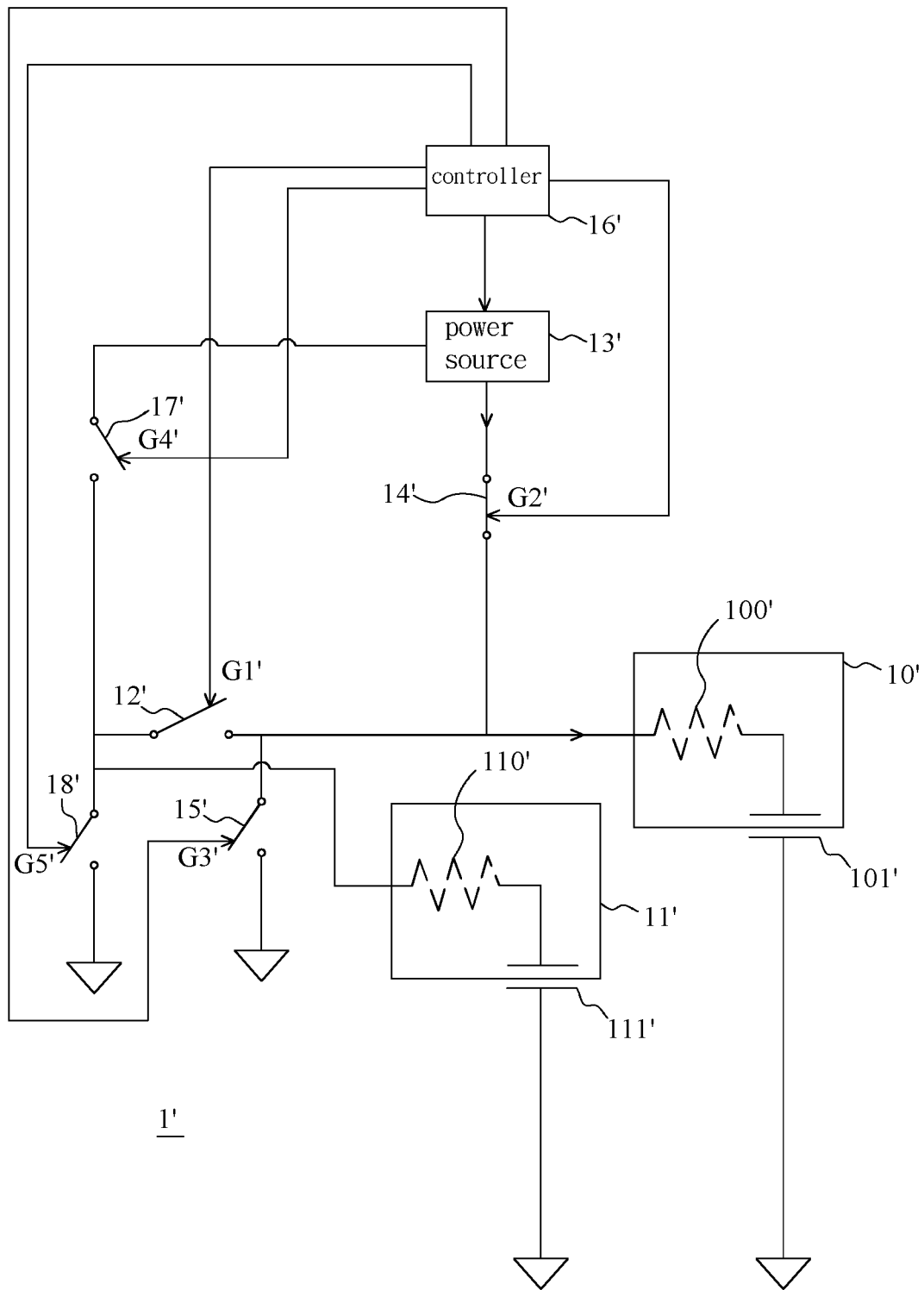
FIGS. 11(a)-11(d) show the operation of the active stylus in FIG. 10.
Figure 11B:
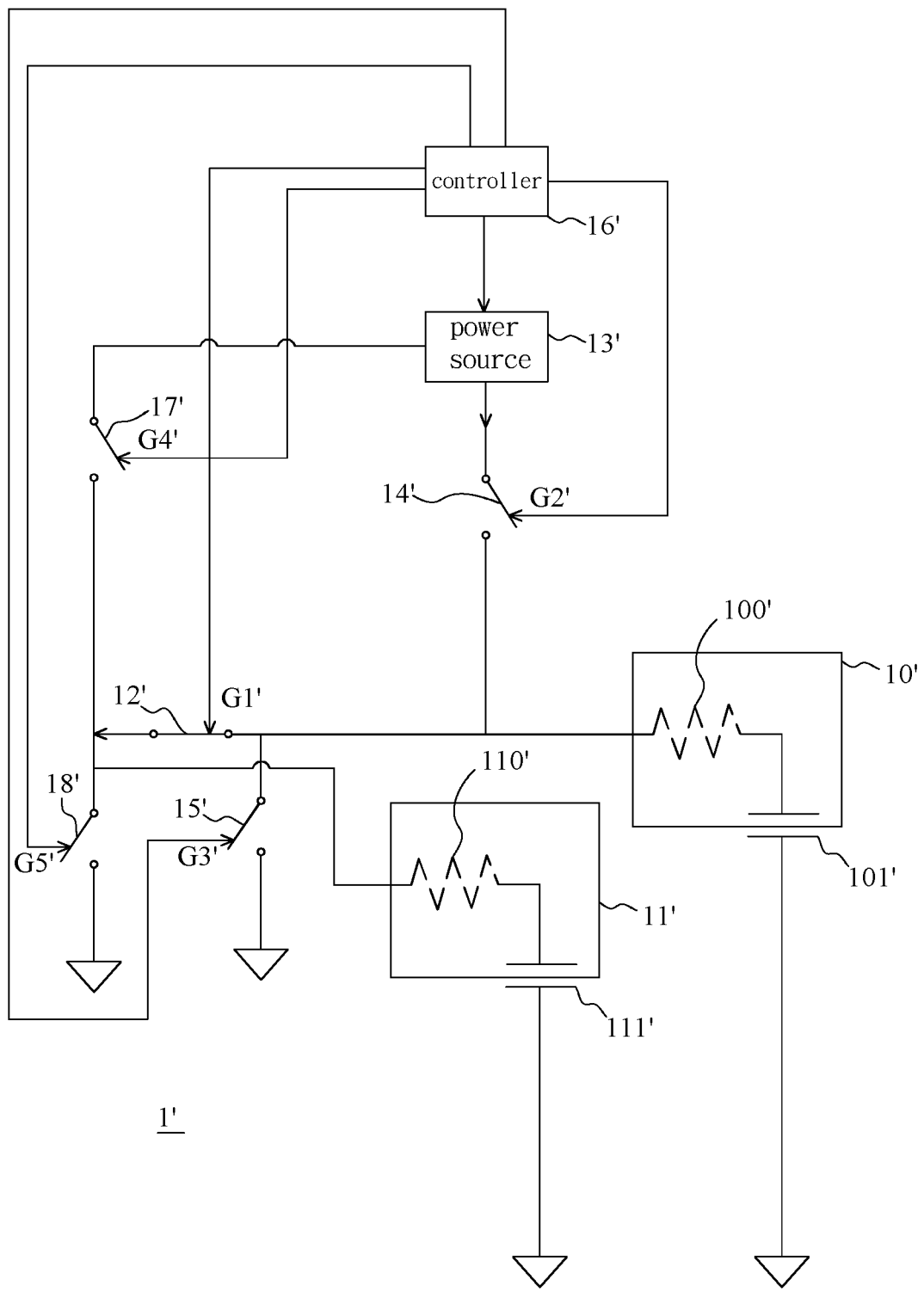
Figure 11C:
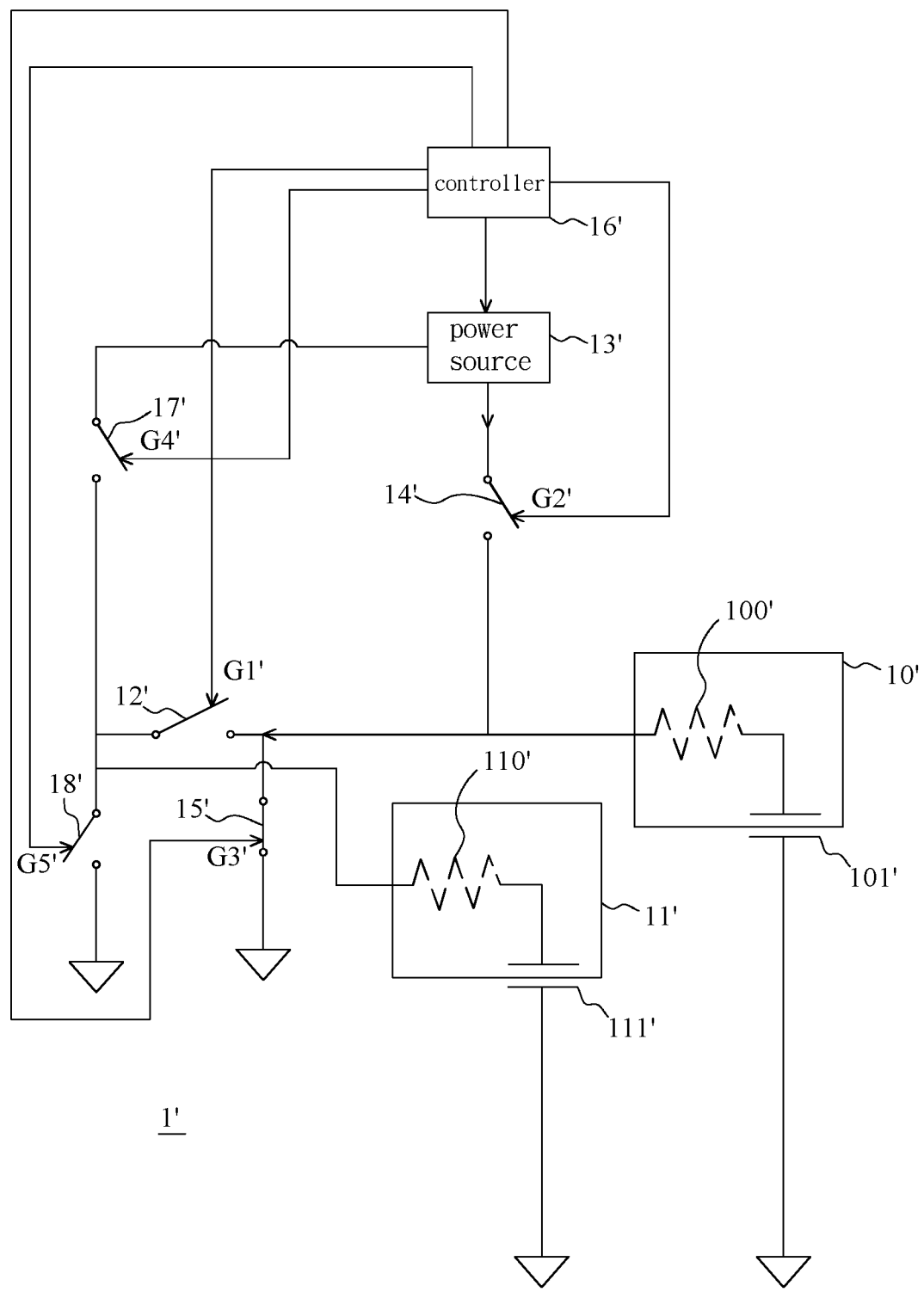
Figure 11D:
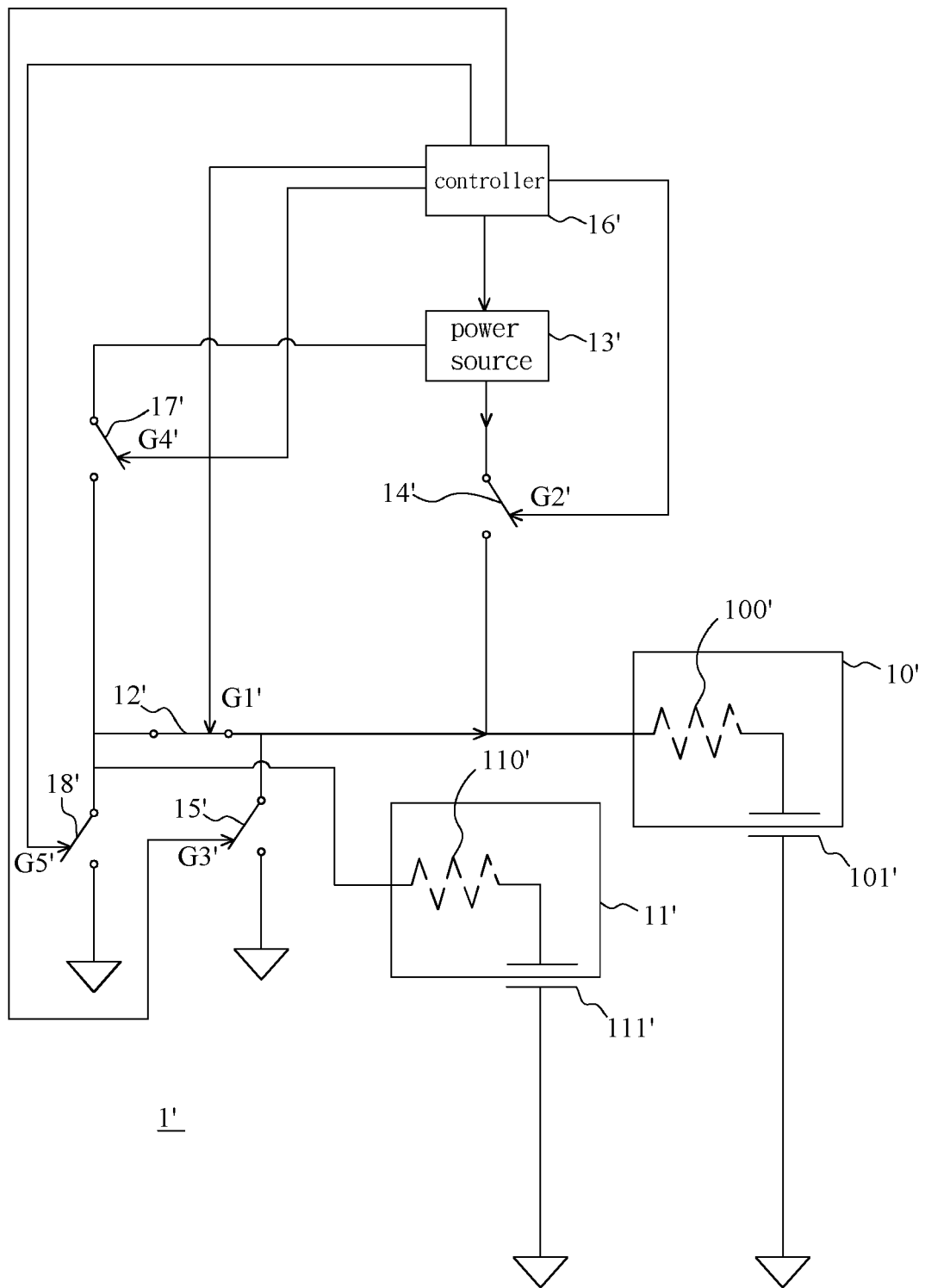

FIG. 10 is a diagram schematically showing the equivalent circuit of an active stylus according to a third embodiment of the invention. Please refer to FIG. 10. The active stylus 1' includes a first electrode 10', a second electrode 11', a first switch 12', a power source 13', and a second switch 14'. The first switch 12' is coupled between the first electrode 10' and the second electrode 11'. The second switch 14' is coupled between the power source 13' and the first electrode 10'. The first electrode 10' has a resistance 100' and the second electrode 11' has a resistance 110'. The first electrode 10' and the second electrode 11' respectively form a first coupling capacitor 101' and a second coupling capacitor 111' with conductors adjacent to the first electrode 10' and the second electrode 11'. The conductors may be, but not limited to, touch panels. In some embodiments, the active stylus 1' may further include a third switch 15', a controller 16', a fourth switch 17', and a fifth switch 18'. The third switch 15' is coupled between the first electrode 10' and a grounding terminal. The controller 16' is coupled to the power source 13', the first switch 12', the second switch 14', the third switch 15', the fourth switch 17', and the fifth switch 18' and configured to turn on or turn off the first switch 12', the second switch 14', the third switch 15', the fourth switch 17', and the fifth switch 18'. The power source 13' can be, for example, a voltage source providing a first voltage or a current source providing a first current. The combination of the controller 16', the power supply 13', and the switch 14' can be regarded as an excitation signal generator that provides an excitation signal for the electrode 10'. The controller 16' can control the power source 13' to turn on or turn off. The controller 16' and the power source 13' may be integrated into an integrated circuit device or arranged separately and independently. The fourth switch 17' is coupled between the power source 13' and the second electrode 11'. The fifth switch 18' is coupled between the second electrode 11' and the grounding terminal.

FIGS. 11(*a*)-11(*d*) respectively show the operation of the active stylus 1' of FIG. 10 in a first phase, a second phase, a third phase, and a fourth phase. The first switch 12' is controlled by a control signal G1', the second switch 14' is controlled by a control signal G2', the third switch 15' is controlled by a control signal G3', the fourth switch 17' is controlled by a control signal G4', and the fifth switch 18' is controlled by a control signal G5'. The control signals G1'—G5' are provided by the controller 16.

As shown in FIG. 11(*a*), in the first phase, the controller 16' turns on the second switch 14' and turns off the first switch 12', the third switch 15', the fourth switch 17', and the fifth switch 18', so that the power source 13' provides a first voltage or a first current for the first electrode 10'. As shown in FIG. 11(*b*), in the second phase after the first phase, the controller 16' turns off the second switch 14', the third switch 15', the fourth switch 17', and the fifth switch. 18' and turns on the first switch 12', so that the first electrode 10' charges the second electrode 11' through the first switch 12', so as to increase the voltage of the second electrode 11'. This process can be understood as that the charges of the first electrode 10' are recycled to the second coupling capacitor 111'. As shown in FIG. 11(*c*), in the third phase after the second phase, the controller 16' turns off the first switch 12', the second switch 14', the fourth switch 17', and the fifth switch. 18' and turns on the third switch 15'. At this time, the first electrode 10' is grounded. As shown in FIG. 11(*d*), in the fourth phase after the third phase, the controller 16' turns off the second switch 14', the third switch 15', the fourth switch 17', and the fifth switch 18' and turns on the first switch 12. At this time, the second coupling capacitor 111' charges the first electrode 10' to increase the voltage of the first electrode 10'. From the foregoing process, it can be understood that the charges are firstly recycled to the second coupling capacitor 111' in the second phase. Then, the second coupling capacitor 111' recharges the first electrode 10' in the fourth phase, so that the voltage of the first electrode 10' rises to a first level. When the operation of the active stylus 1' returns to the first phase, the power source 13' only needs less power to pull up the voltage of the first electrode 10' from the first level to a required second level. Therefore, the operation of the active stylus 1' can save power. In one embodiment, the fourth switch 17' can be omitted, which means that the power source 13' is not coupled to the second electrode 11'. The second electrode 11' may be configured to receive signals rather than to emit signals.

Figure 12:
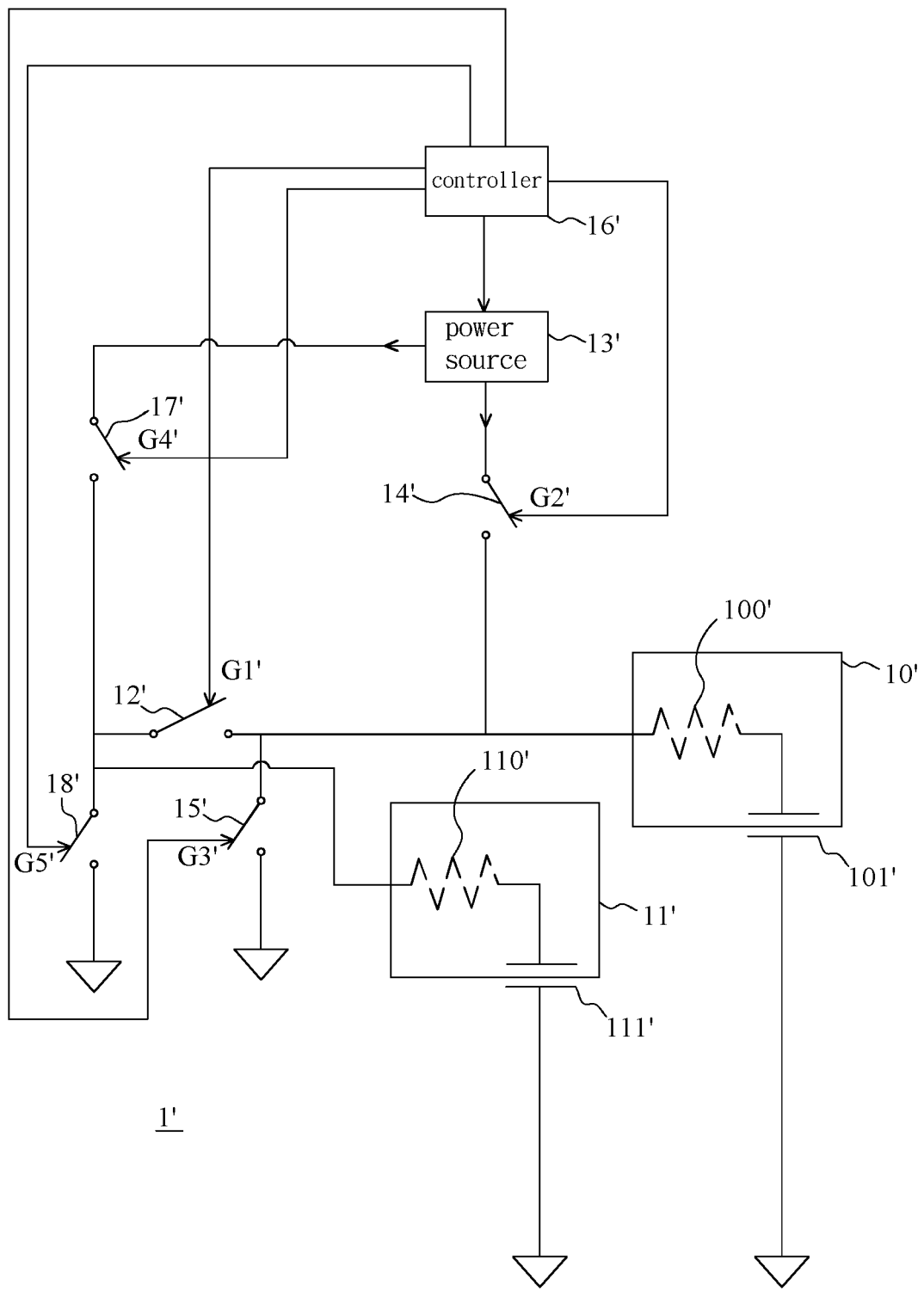
FIG. 12 is a diagram schematically showing the equivalent circuit of an active stylus according to a fourth embodiment of the invention.
Figure 13A:
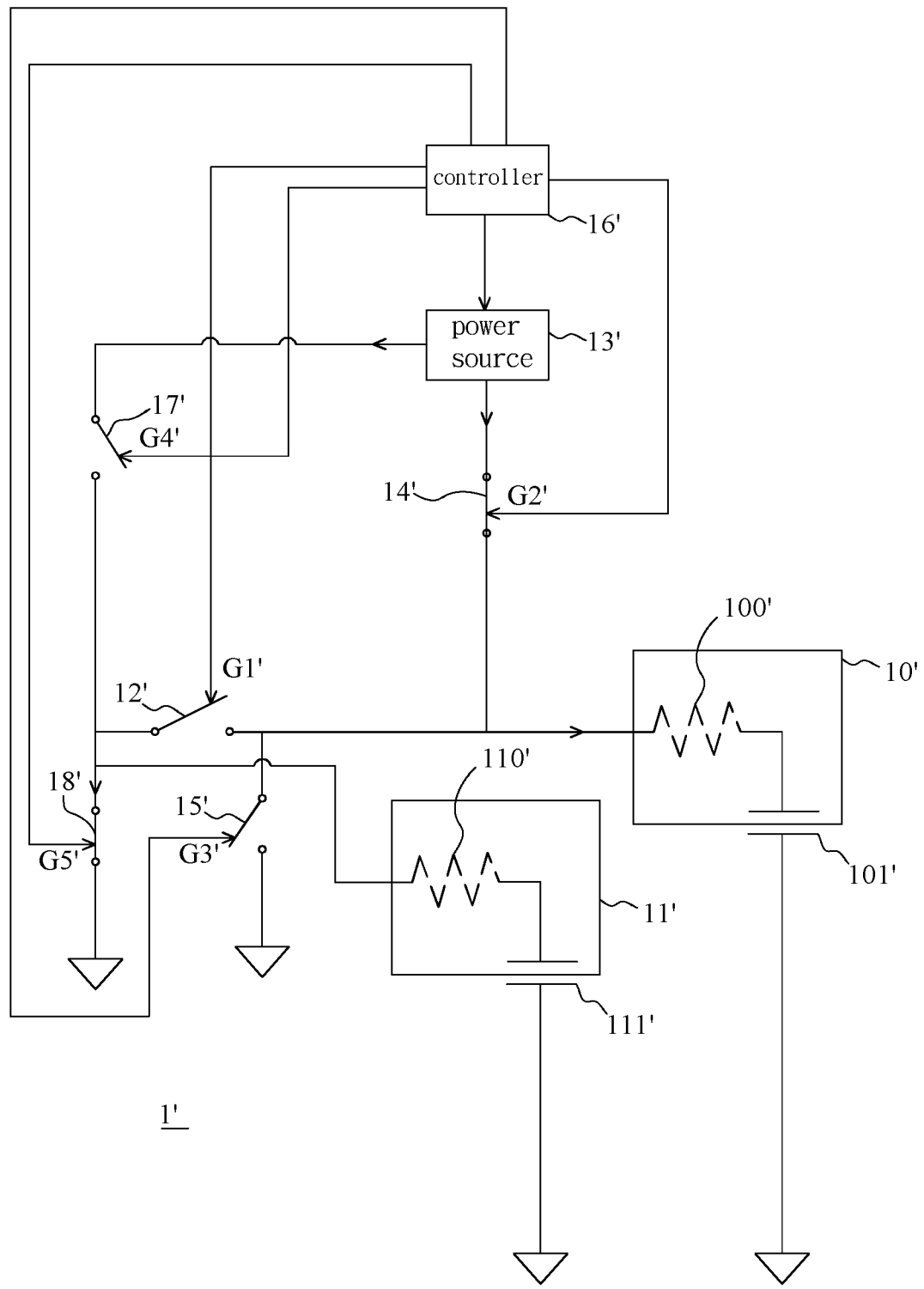
FIGS. 13(a)-13(d) show the operation of the active stylus in FIG. 12.
Figure 13B:
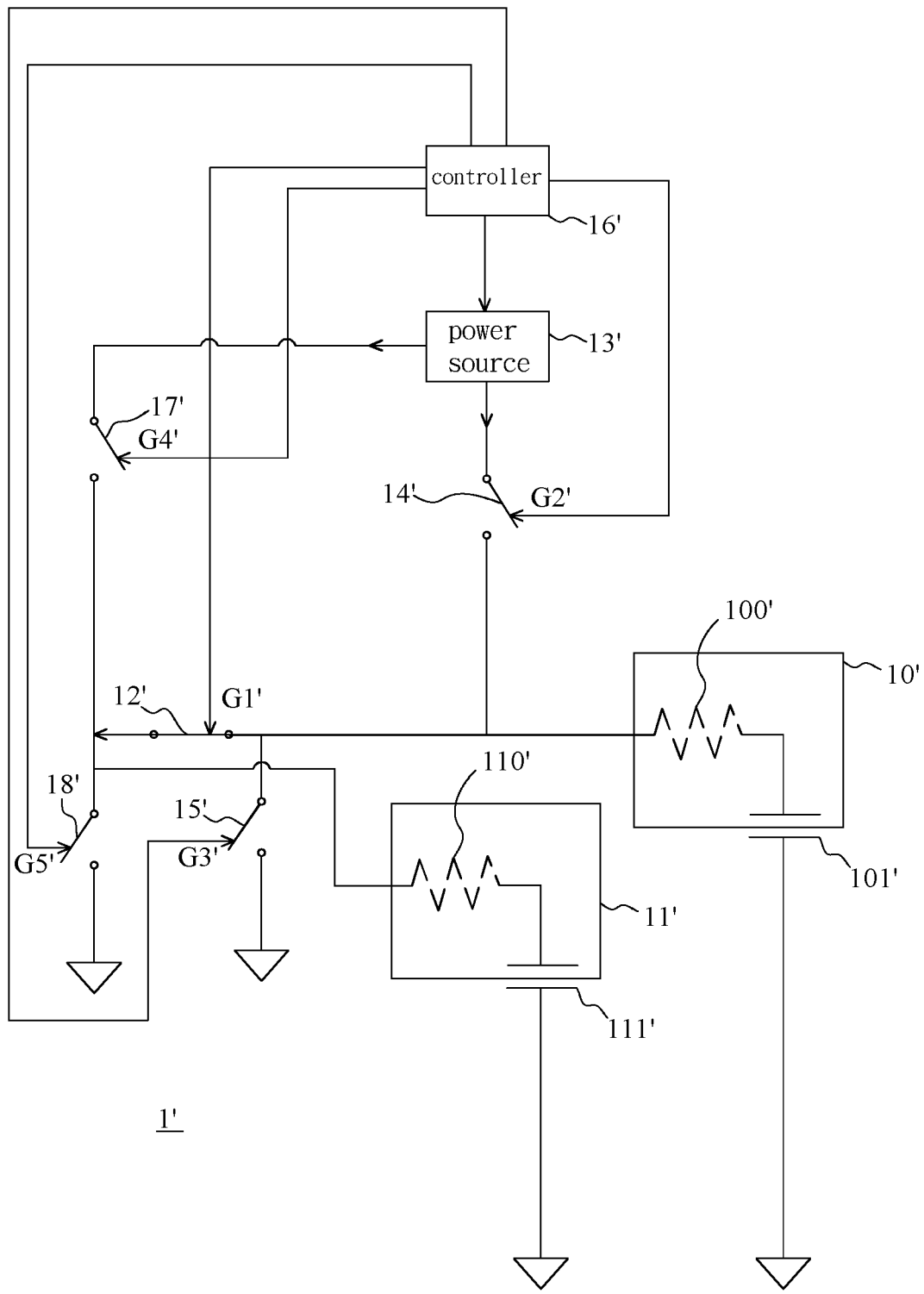
Figure 13C:
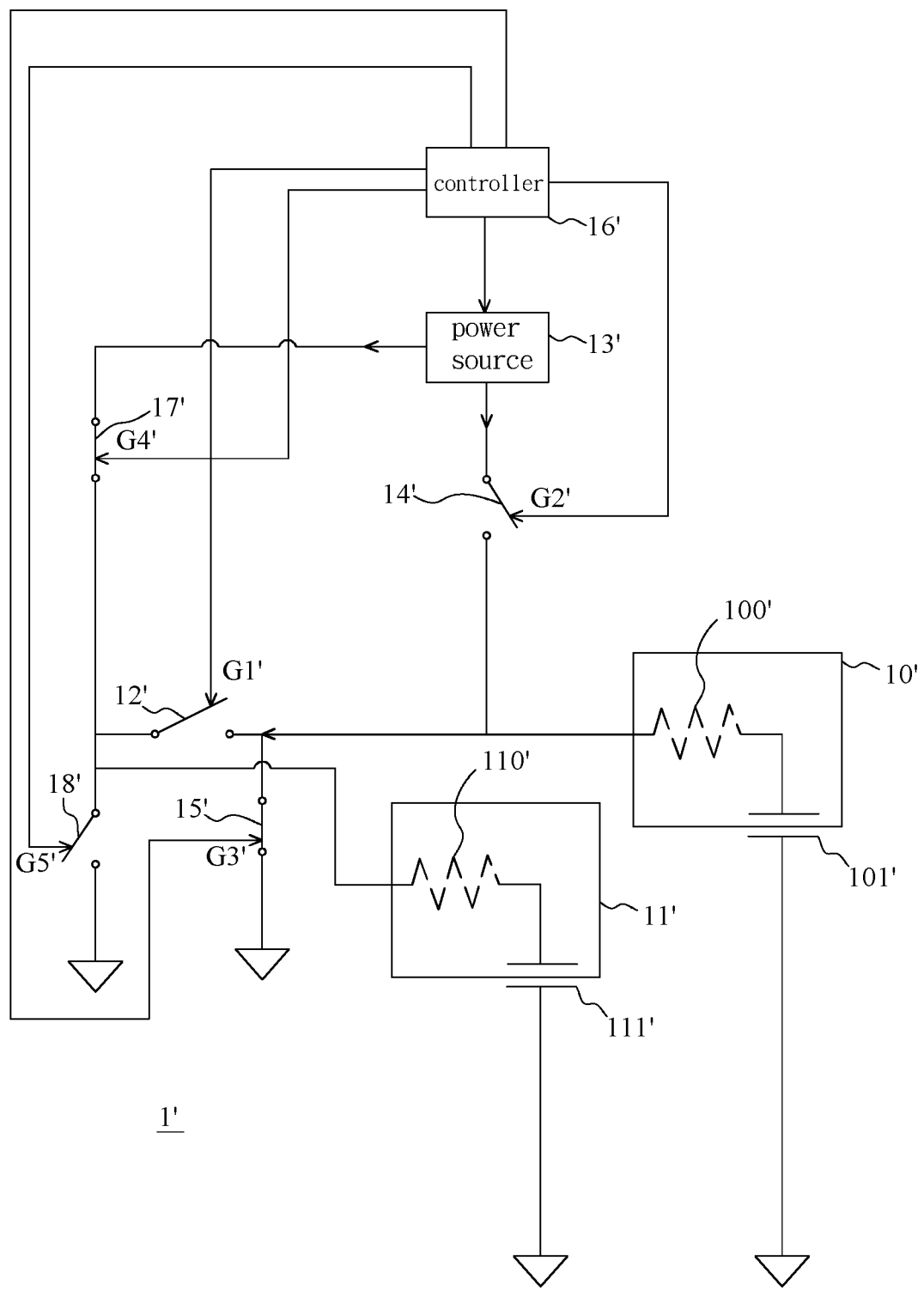
Figure 13D:
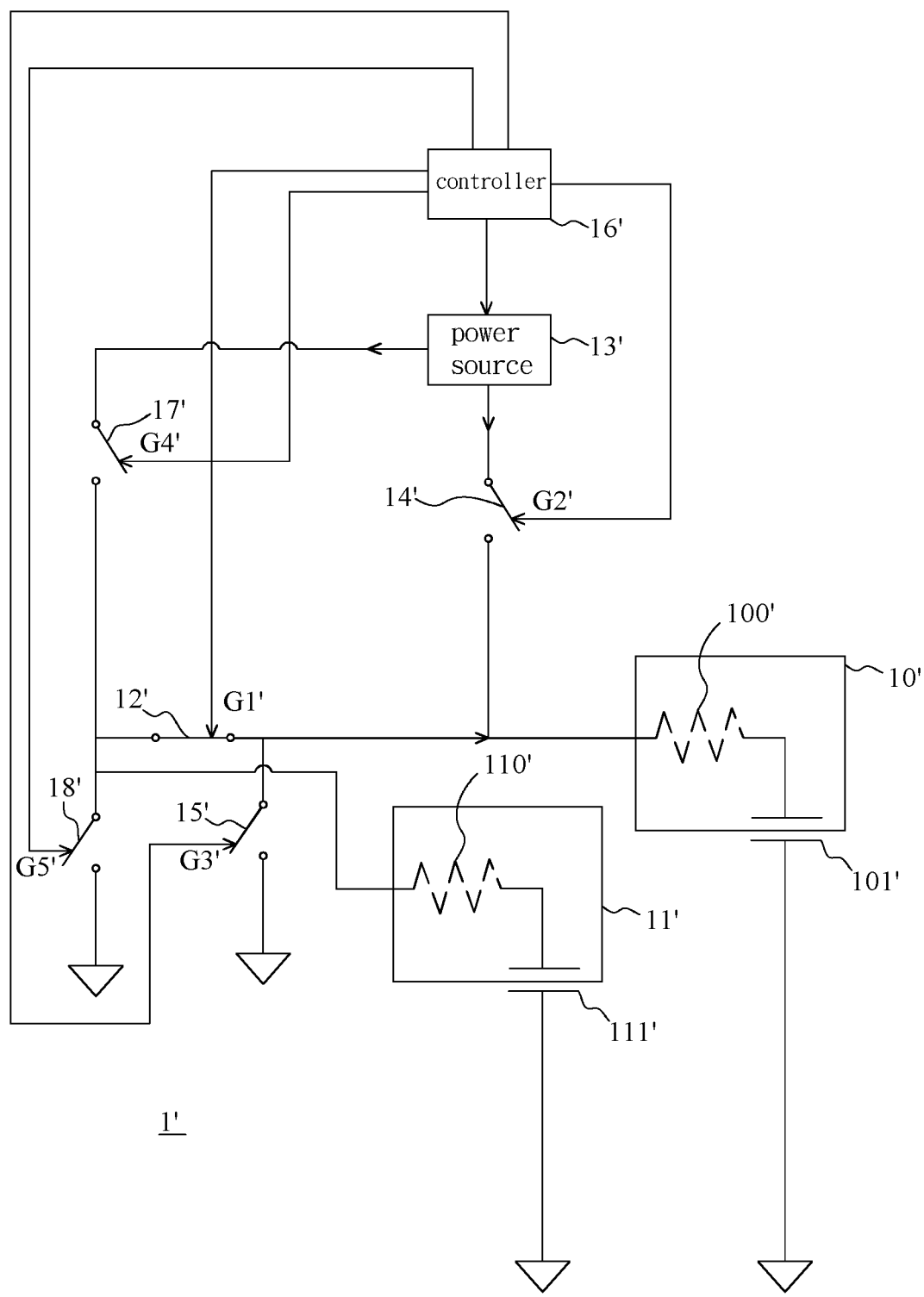

FIG. 12 shows a fourth embodiment of the active stylus of the invention. The equivalent circuit of the fourth embodiment is the same as that of the third embodiment (i.e., FIG. 10) and will not be repeated here. In the fourth embodiment, the controller 16' can further control the power source 13' to provide a second voltage or a second current for the second electrode 11'.

FIGS. 13(*a*)-13(*d*) respectively show the operation of the active stylus 1' of FIG. 12 in a first phase, a second phase, a third phase, and a fourth phase. The first switch 12' is controlled by a control signal G1', the second switch 14' is controlled by a control signal G2', the third switch 15' is controlled by a control signal G3', the fourth switch 17' is controlled by a control signal G4', and the fifth switch 18' is controlled by a control signal G5'. The control signals G1'—G5' are provided by the controller 16. As shown in FIG. 13(*a*), in the first phase, the controller 16' turns on the second switch 14' and the fifth switch 18' and turns off the first switch 12', the third switch 15', and the fourth switch 17', so that the power source 13' provides a first voltage or a first current for the first electrode 10'. At this time, the second electrode 11' is grounded. As shown in FIG. 13(*b*), in the second phase after the first phase, the controller 16' turns off the second switch 14', the third switch 15', the fourth switch 17', and the fifth switch. 18' and turns on the first switch 12', so that the first electrode 10' charges the second electrode 11' through the first switch 12', so as to increase the voltage of the second electrode 11'. This process can be understood as that the charges provided to the first electrode 10' are recycled to the second electrode 11' for use. The capacitance levels of the first coupling capacitor 101' and the second coupling capacitor 111' are equal. For example, the capacitances of the first coupling capacitor 101' and the second coupling capacitor 111' are not greater than 50 pF. As a result, in the second phase, the voltage of the first electrode 10' rapidly descends to a lower level and the voltage of the second electrode 11' rapidly rises to a higher voltage. As shown in FIG. 13(*c*), in the third phase after the second phase, the controller 16' turns off the first switch 12', the second switch 14', and the fifth switch 18' and turns on the third switch 15' and the fourth switch 17'. At this time, the first electrode 10' is grounded and the power source 13' provides a second voltage or a second current for the second electrode 11'. As shown in FIG. 13(*d*), in the fourth phase after the third phase, the controller 16' turns off the second switch 14', the third switch 15', the fourth switch 17', and the fifth switch. 18' and turns on the first switch 12. The capacitance levels of the first coupling capacitor 101' and the second coupling capacitor 111' are equal. In the fourth phase, the second coupling capacitor 111' charges the first electrode 10' to rapidly increase the voltage of the first electrode 10' and to rapidly decrease the voltage of the second electrode 11'. This process can be understood as that the charges provided to the second electrode 11' are recycled to the first electrode 10' for use. From the foregoing process, it can be understood that the charges recycled from the first electrode 10' will first pull up the voltage of the second electrode 11' in the second phase. Accordingly, in the third phase, the power source 13' only needs less power to pull up the voltage of the second electrode 11' to a required level. In the fourth phase, the charges recycled from the second electrode 11' will firstly pull up the voltage of the first electrode 10'. As a result, in the first phase, the power source 13' only needs less power to pull up the voltage of the electrode 10' to a required level. Therefore, the operation of the active stylus 1' can save power.

Figure 14:
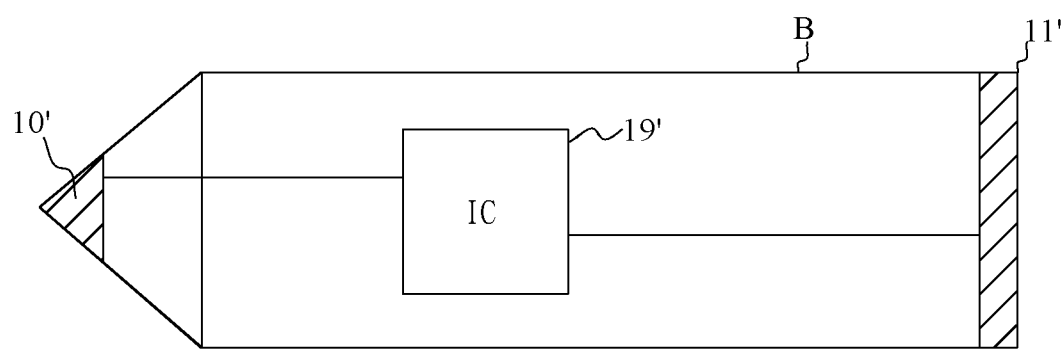
FIG. 14 is a diagram schematically showing the locations of a first electrode and a second electrode on an active stylus body according to an embodiment of the invention.

The charging frequencies of the first coupling capacitor 101' and the second coupling capacitor 111' are equal, but the phase difference between the voltages of the first electrode 10' and the second electrode 11' is 180 degrees. The first electrode 10' and the second electrode 11' can be respectively arranged at the tip and the tail of the active stylus 1'. As shown in FIG. 14, the active stylus 1' includes a stylus body B and an integrated circuit (IC) device 19'. The integrated circuit device 19' is arranged in the stylus body B. The integrated circuit device 19' may include a power source 13' and a controller 16'. In FIG. 14, the first electrode 10' is arranged at the tip of the stylus body B of the active stylus 1' and used as a tip electrode (or a ring electrode). The second electrode 11' is arranged at the tail of the stylus body B of the active stylus 1' and used as a tail electrode. In another embodiment, both the first electrode 10' and the second electrode 11' are arranged at the tip of the stylus body B. There is a distance between the first electrode 10' and the second electrode 11'.

In other embodiments, the number of the first electrodes 10' at the tip of the stylus body B can be multiple and/or the number of the second electrodes 11' at the tail of the stylus body B can also be multiple.

According to the embodiments provided above, the active stylus employs the recycling capacitor or the electrode to recycle charges, thereby having the advantage of saving power.

The embodiments described above are only to exemplify the invention but not to limit the scope of the invention. Therefore, any equivalent modification or variation according to the shapes, structures, features, or spirit disclosed by the invention is to be also included within the scope of the invention.

What is claimed is:

1. An active stylus comprising:
    an electrode;
    a recycling capacitor having a first terminal and a second terminal, wherein the second terminal is always grounded;
    a first switch coupled between the recycling capacitor and the electrode;
    a power source; and
    a second switch coupled between the power source and the electrode;
    wherein in a first phase, the second switch is turned on, the power source provides a voltage or a current for the electrode, and the first switch is turned off, and in a second phase, the second switch is turned off and the first switch is turned on, thereby the recycling capacitor is charged by charges recycled from the electrode.

2. The active stylus according to claim 1, further comprising a third switch coupled between the electrode and a grounding terminal, wherein in a third phase after the second phase, the first switch and the second switch are turned off and the third switch is turned on.

3. The active stylus according to claim 2, wherein in a fourth phase after the third phase, the first switch is turned on and the second switch and the third switch are turned off.

4. The active stylus according to claim 2, further comprising a controller coupled to the first switch, the second switch, and the third switch and configured to turn on or turn off the first switch, the second switch, and the third switch.

5. The active stylus according to claim 4, wherein the controller and the power source are integrated in an integrated circuit device.

6. The active stylus according to claim 5 wherein the recycling capacitor is integrated in the integrated circuit device.

7. The active stylus according to claim 1, further comprising a voltage regulator coupled to the recycling capacitor.

8. The active stylus according to claim 1, wherein the electrode is arranged at a tip or a tail of the active stylus.

9. The active stylus according to claim 1, wherein the power source is a voltage source or a current source.

10. An active stylus comprising:
a first electrode;
a second electrode forming a coupling capacitor with a conductor adjacent to the second electrode, wherein the conductor is always grounded;
a first switch coupled between the first electrode and the second electrode;
a power source; and
a second switch coupled between the power source and the first electrode;
wherein in a first phase, the second switch is turned on, the power source provides a first voltage or a first current for the first electrode, and the first switch is turned off, and in a second phase, the second switch is turned off and the first switch is turned on, thereby the coupling capacitor is charged by charges recycled from the first electrode.

11. The active stylus according to claim 10, further comprising a third switch coupled between the first electrode and a grounding terminal, and in a third phase after the second phase, the first switch and the second switch are turned off and the third switch is turned on.

12. The active stylus according to claim 11, wherein in a fourth phase after the third phase, the first switch is turned on and the second switch and the third switch are turned off.

13. The active stylus according to claim 12, further comprising a fourth switch coupled between the power source and the second electrode, wherein in the third phase, the fourth switch is turned on and the power source further provides a second voltage or a second current for the second electrode, and in the first phase, the second phase, and the fourth phase, the fourth switch is turned off.

14. The active stylus according to claim 13, further comprising a fifth switch coupled between the second electrode and the grounding terminal, wherein in the first phase, the fifth switch is turned on, and in the second phase, the third phase, and the fourth phase, the fifth switch is turned off.

15. The active stylus according to claim 14, further comprising a controller coupled to the first switch, the second switch, the third switch, the fourth switch, and the fifth switch and configured to turn on or turn off the first switch, the second switch, the third switch, the fourth switch, and the fifth switch.

16. The active stylus according to claim 15, wherein the controller and the power source are integrated in an integrated circuit device.

17. The active stylus according to claim 10, wherein the first electrode and the second electrode are respectively arranged at a tip and a tail of the active stylus.

18. The active stylus according to claim 10, wherein the power source is a voltage source or a current source.

* * * * *